US012672637B2

(12) United States Patent
Smith

(10) Patent No.: US 12,672,637 B2
(45) Date of Patent: Jul. 7, 2026

(54) ANIMAL TAG ASSEMBLY

(71) Applicant: Ceres Tag Ltd, Brisbane (AU)

(72) Inventor: David Ian Smith, Brisbane (AU)

(73) Assignee: CERES TAG LTD, Brisbane (AU)

( * ) Notice: Subject to any disclaimer, the term of this patent is extended or adjusted under 35 U.S.C. 154(b) by 30 days.

(21) Appl. No.: 18/873,182

(22) PCT Filed: Jun. 9, 2023

(86) PCT No.: PCT/AU2023/050506
§ 371 (c)(1),
(2) Date: Dec. 9, 2024

(87) PCT Pub. No.: WO2023/235930
PCT Pub. Date: Dec. 14, 2023

(65) Prior Publication Data
US 2025/0359532 A1     Nov. 27, 2025

(30) Foreign Application Priority Data
Jun. 10, 2022     (AU) ................................. 2022901598

(51) Int. Cl.
*A01K 11/00*         (2006.01)
*H02S 20/30*         (2014.01)
(52) U.S. Cl.
CPC ............ *A01K 11/004* (2013.01); *H02S 20/30* (2014.12)
(58) Field of Classification Search
CPC ..... A01K 11/004; A01K 11/001; H02S 20/30; G09F 3/208
See application file for complete search history.

(56) References Cited

U.S. PATENT DOCUMENTS 6,862,550 B1 *   3/2005   Cook ..................... G01N 33/12
                                                       374/45
7,830,257 B2 *   11/2010   Hassell ................ A01K 11/006
                                                       340/539.22

(Continued)

FOREIGN PATENT DOCUMENTS

CN         105191817 B      10/2019
CN         110771527 B      9/2021

(Continued)

OTHER PUBLICATIONS

Sharma, A. (Authorized Officer) International Search Report and Written Opinion in corresponding International Application No. PCT/AU2023/050506 mailed on Jul. 27, 2023, 10 pages.

(Continued)

*Primary Examiner* — Nay Tun
(74) *Attorney, Agent, or Firm* — MH2 Technology Law Group LLP

(57)                ABSTRACT

Animal ear tag assembly comprising: ear tag comprising a housing for enclosing electronic components, the housing comprising at least photovoltaic panel being arranged to form an external frontal outer face of the tag for receiving sunlight and powering the electronic componentry therein; a tether body configured to contact the animal's body during use, the tether body having an in-use upper female coupling portion for receiving and coupling an ear attachment stud member and an in-use lower cradle portion being configured for securing an attachment portion of the ear tag extending from the housing of the tag to arrange the photovoltaic panel in an outwardly facing configuration during use.

12 Claims, 9 Drawing Sheets

(56) References Cited

U.S. PATENT DOCUMENTS

| | | | |
|---|---|---|---|
| 2005/0145187 A1* | 7/2005 | Gray | A01K 29/00 |
| | | | 119/174 |
| 2012/0201277 A1* | 8/2012 | Tanner | G06Q 10/08 |
| | | | 375/141 |
| 2016/0295833 A1* | 10/2016 | Baize | A01K 15/029 |
| 2018/0020641 A1* | 1/2018 | Holman | A01K 19/00 |
| | | | 119/822 |
| 2018/0132449 A1 | 5/2018 | Auer | |
| 2018/0146645 A1* | 5/2018 | Arbel | G06Q 10/0833 |
| 2021/0022615 A1* | 1/2021 | Greer | G08B 21/182 |
| 2021/0185979 A1* | 6/2021 | Jones | A01K 11/004 |
| 2022/0200519 A1* | 6/2022 | Biffert | A01K 11/004 |
| 2022/0369593 A1* | 11/2022 | Vogels | A01K 11/004 |

FOREIGN PATENT DOCUMENTS

| | | | |
|---|---|---|---|
| WO | 2008108816 A1 | 9/2008 | |
| WO | 2022066846 A1 | 3/2022 | |

OTHER PUBLICATIONS

Sharma, A. (Authorized Officer) International Preliminary Report on Patentability in corresponding International Application No. PCT/AU2023/050506 mailed on Jan. 24, 2024, 33 pages.

\* cited by examiner

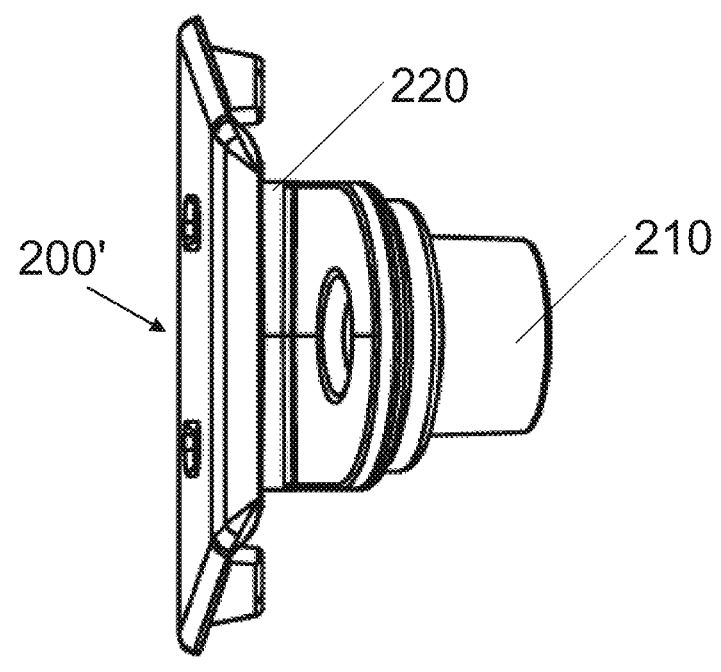
FIGURE 19
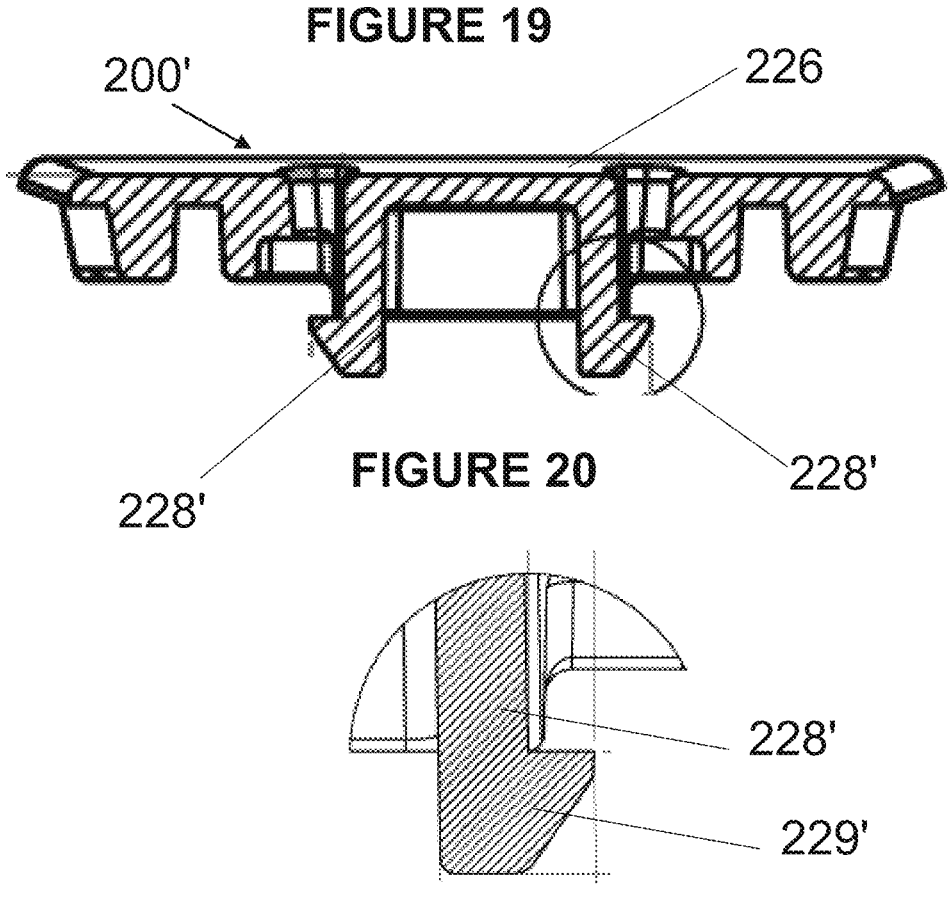
FIGURE 20
FIGURE 20A

ANIMAL TAG ASSEMBLY

CROSS-REFERENCE TO RELATED APPLICATIONS

The present application is a national stage entry from International Application No. PCT/AU2023/050506, filed on Jun. 9, 2023, published as International Publication No. WO 2023/235930 A1 on Dec. 14, 2023, and claims priority to Australian Patent Application No. 2022901598, filed on Jun. 10, 2022, the disclosures of all of which are hereby incorporated by reference in their entireties.

TECHNICAL FIELD

The present invention relates to an improved animal tag assembly which is particularly suitable for being attached to an animal's ear.

BACKGROUND

Any references to methods, apparatus or documents of the prior art are not to be taken as constituting any evidence or admission that they formed, or form part of the common general knowledge.

Livestock tracking has become more important with the increase in livestock theft and the requirement to monitor and track livestock regularly to make various assessments related to vegetation management. Many animal tags have electronic componentry which makes the manufacture of these tags expensive. Therefore, it is important for these tags to be re-usable. It is also important to reduce damage caused to these tags during use. It is therefore pertinent to propose improvements in tag assemblies which address at least some of these requirements.

SUMMARY OF INVENTION

In an aspect, the invention provides an animal ear tag assembly comprising:
   ear tag comprising a housing for enclosing electronic components, the housing comprising at least photovoltaic panel being arranged to form an external frontal outer face of the tag for receiving sunlight and powering the electronic componentry therein;
   a tether body configured to contact the animal's body during use, the tether body having an in-use upper female coupling portion for receiving and coupling an ear attachment stud member and an in-use lower cradle portion being configured for securing an attachment portion of the ear tag extending from the housing of the tag to arrange the photovoltaic panel in an outwardly facing configuration during use.
   In an aspect of the present invention there is provided an animal ear tag assembly comprising: a housing for enclosing electronic components, the housing comprising at least photovoltaic panel being arranged to form an external frontal outer face of the tag for receiving sunlight and powering the electronic componentry therein; a tether body configured to contact the animal's body during use, the tether body having an in-use upper female coupling portion for receiving and coupling an ear attachment stud member and an in-use lower cradle portion being configured for securing an attachment portion of the ear tag extending from the housing of the tag to arrange the photovoltaic panel in an outwardly facing configuration during use, wherein the attachment portion comprises a cradle engaging member extending along the length of one of said side walls of the ear tag housing, the cradle engaging member being attached to the side walls by spaced apart legs such that the cradle engaging member, the spaced apart legs and a portion of one of the side walls define a hollow opening.

In an embodiment, the ear tag housing comprises a rear inner face that is spaced away from the frontal outer face with side walls extending between frontal face and rear face to form the housing to house the electronics and wherein the attachment portion of the ear tag projects outwardly from one of the side walls of the ear tag.

In an embodiment, the attachment portion comprises a cradle engaging member extending along the length of one of said side walls of the ear tag housing, the cradle engaging member being attached to the side walls by spaced apart legs such that the cradle engaging member, the spaced apart legs and a portion of one of the side walls define a hollow opening.

In an embodiment, the hollow opening comprises an upper opening portion located above a lower opening portion wherein the lower opening portion is narrower than the upper opening portion.

In an embodiment, each leg comprises a thickness extending a transverse direction relative to the length of the ear tag wherein the thickness of the legs increases in an in-use downwardly direction towards the side wall to form a respective wedge-shaped body.

In an embodiment, the wedge-shaped body formed by each leg is dimensioned to tilt the outer face such that the plane of the outer face is at an acute angle relative to the plane of the upper female coupling portion of the tether body.

In an embodiment, the in-use lower cradle portion is formed by two spaced apart walls separated by a channel portion to receive and secure the cradle engagement member of the tag body.

In an embodiment, the first of said spaced apart walls is formed continuously with the upper female coupling portion and the second of said spaced apart wall comprises a wall height that is greater than height of the cradle engagement member to avoid contact between the cradle engagement portion and skin of the animal during use.

In an embodiment, the second of said walls further comprises a downwardly dependent portion to form a shield between the attachment portion of the tag and the animal's skin during use.

In an embodiment, the channel portion of the cradle is positioned in the upper opening portion of the hollow opening.

In an embodiment, the tether body further comprises an additional tether engagement portion that snaps into the lower opening portion of the tag.

In an embodiment, the coupling portion of the tether body comprises a through hole extending therethrough for receiving and securing the stud member.

In an embodiment, the coupling portion of the tether body is adapted to receive and secure the stud member whereby the stud member comprises an enlarged head with an elongate shank such that the shank portion of the stud member is received into a first lateral side along a first direction and allows the shank to be inserted and passed through the tether body in a transverse direction to secure the stud member to the tether body and wherein the cradle generally projects in an opposite direction relative to the first direction to prevent removal of the tag member without uncoupling of the stud member from the tether body.

In another aspect, the invention provides a tether body for tethering an animal ear tag to an animal's ear, the tether body being shaped to contact the animal's body during use and avoid direct contact between the animal's body and the animal ear tag, the tether body comprising: an in-use upper female coupling portion for receiving and coupling an ear attachment stud member; and an in-use lower cradle portion being configured for securing an attachment portion of the animal ear tag extending from a housing of the tag to arrange a photovoltaic panel of the animal ear tag in an outwardly facing configuration during use.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 3 to 6 illustrate various views of the combination of the ear tag 100 and the tether body 200.

FIGS. 15 to 20 illustrate various isolated views of another embodiment of the tether body 200'.

DETAILED DESCRIPTION OF PREFERRED EMBODIMENTS

Figure 1:
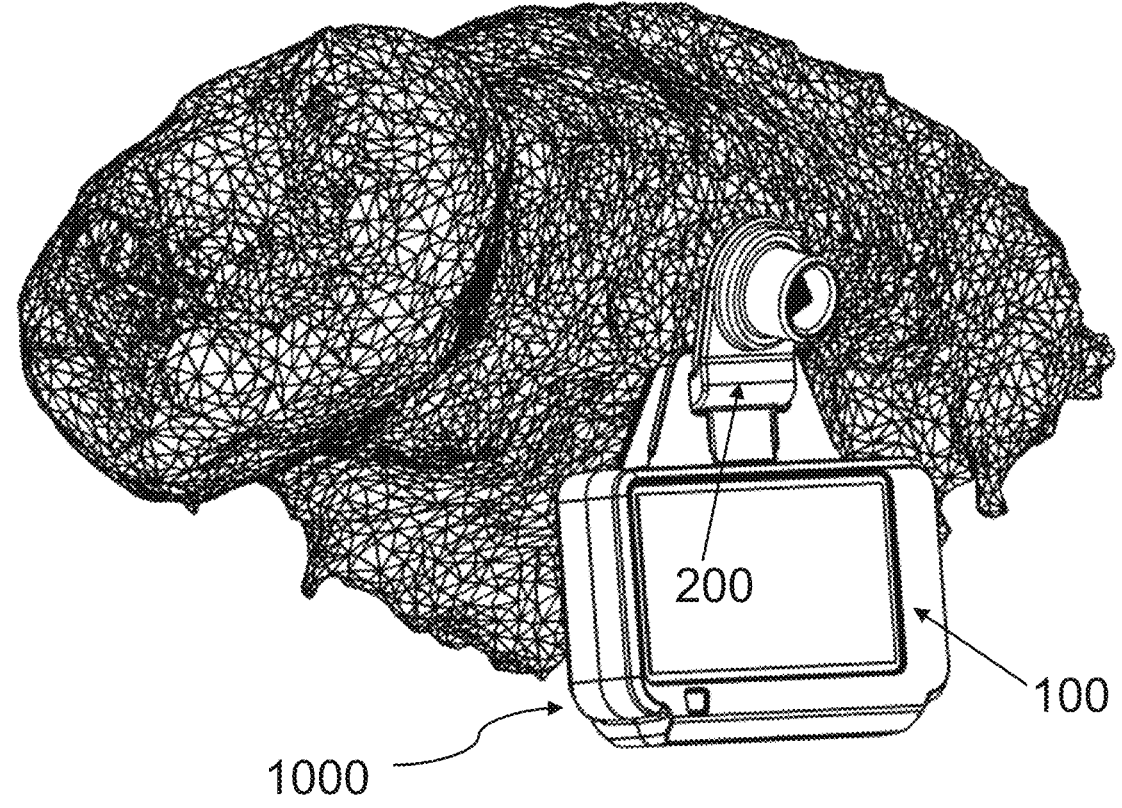
FIG. 1 is a perspective view (environmental view) of the animal tag assembly 1000.
Figure 2:
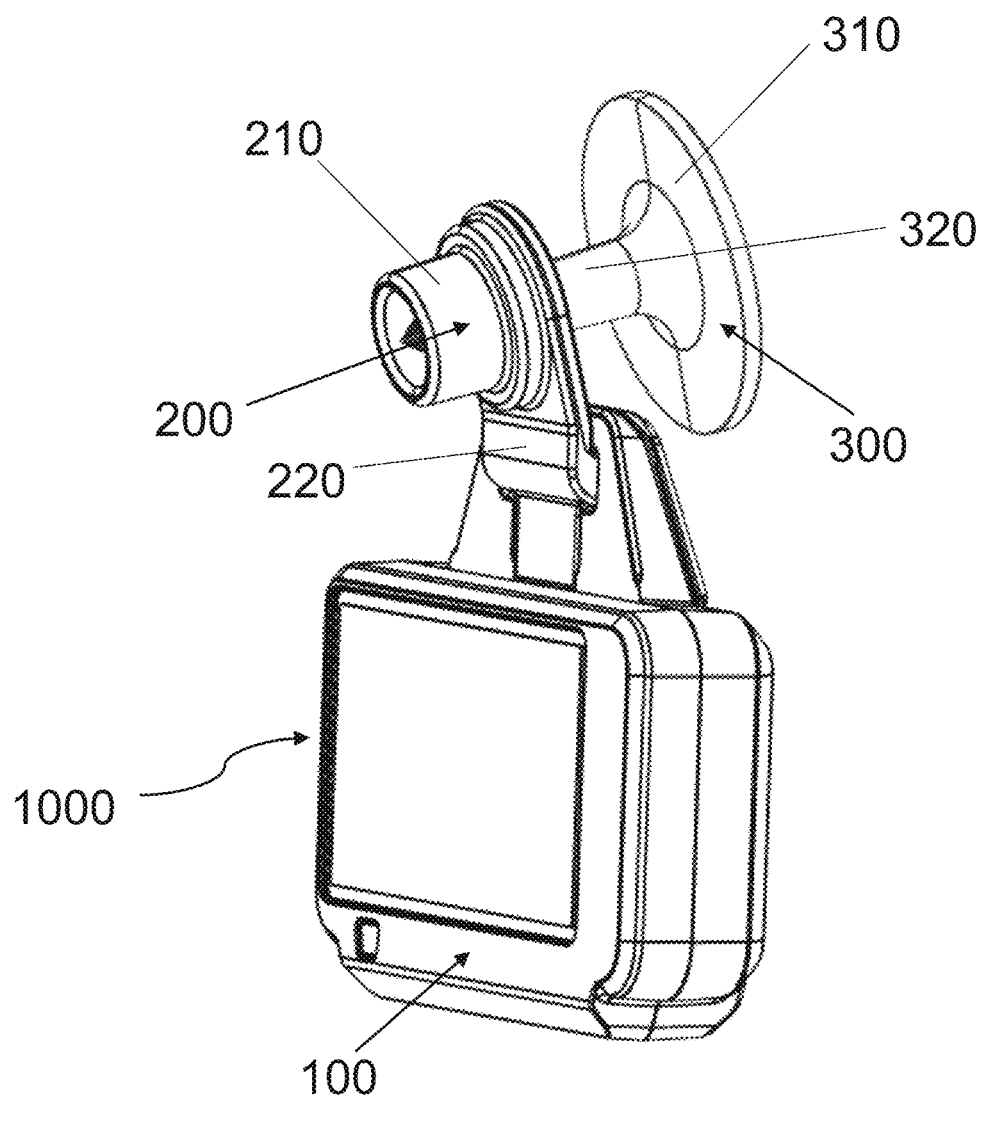
FIG. 2 is a perspective view of the animal tag assembly 1000.

FIGS. 1 to 14 illustrate an embodiment of an animal tag assembly 1000 in accordance with the present invention. FIG. 1 depicts an in-use perspective view of the animal tag assembly shown attached to an animal's ear. The animal ear tag assembly 1000 (best shown in FIG. 2) comprises three main parts namely, an electronic ear tag 100, a tether body 200 and a stud member 300. As will be clear from the foregoing sections, the tether body 200 facilitates the attachment of the electronic ear tag 100 to the stud member 300 in a novel manner which addresses some of the problems of the currently known mechanisms for attachment of ear tags on the ears of animals such as cows and sheep. The stud member 300 comprises an enlarged head 310 with an elongate shank 320 having a pointed tip which is configured to pierce through the animal's ear pinna. The stud member 300 is fastened to the upper coupling portion 210 for attaching the tether body 200 after the electronic tag 100 has been loaded onto the lower cradle portion 220. The upper coupling portion 210 includes a through hole 212 into which the shank 320 is received and secured in non-releasable manner. It is important to note that the ear tag 100 cannot be loaded or removed from the tether body 200 once the stud 300 has been pierced through the animal's ear and attached/secured to the upper coupling portion 210 of the tether body 200. This functionality is because of the novel combination of features of the tether body 200 and the ear tag 100 that will be explained in further detail in the foregoing sections.

FIGS. 3 to 6 illustrate various views of the combination of the tether body 200 with the ear tag loaded 100 loaded onto the tether body 200 prior to attachment to the animal's ear using the stud member 300.

FIGS. 7 to 10 illustrate isolated views of electronic tag 100. The ear tag 100 comprises a housing 110 for enclosing electronic componentry. The housing 110 comprises a cut-out opening on an external frontal outer face 112 to accommodate a photovoltaic panel 125 that can receive sunlight for powering the electronic componentry within the housing of the ear tag 100. The ear tag housing 110 comprises a rear inner face 114 that is spaced away from the frontal outer face 112 with side walls 116 extending between frontal face 112 and rear face 114 to form the housing 110 to house the electronics. The ear tag 100 includes an attachment portion 130 that projects outwardly and upwardly from the top side wall of the ear tag 100. The attachment portion 130 comprises a cradle engagement member 132 extending along the length of the top side wall 116 of the ear tag housing 110. The cradle engaging member 132 is attached to the side wall 116 by spaced apart legs 134 such that the cradle engaging member 132, the spaced apart legs 134 and a portion of one of the side walls define a hollow opening 136. The hollow opening 136 comprises an upper opening portion 136A located above a lower opening portion 136B wherein the lower opening portion 136B is narrower than the upper opening portion 136A with opposed shoulder portions 137 being positioned at an intermediate location between the upper and lower opening portions.

Figures 3, 4, 5, 6:
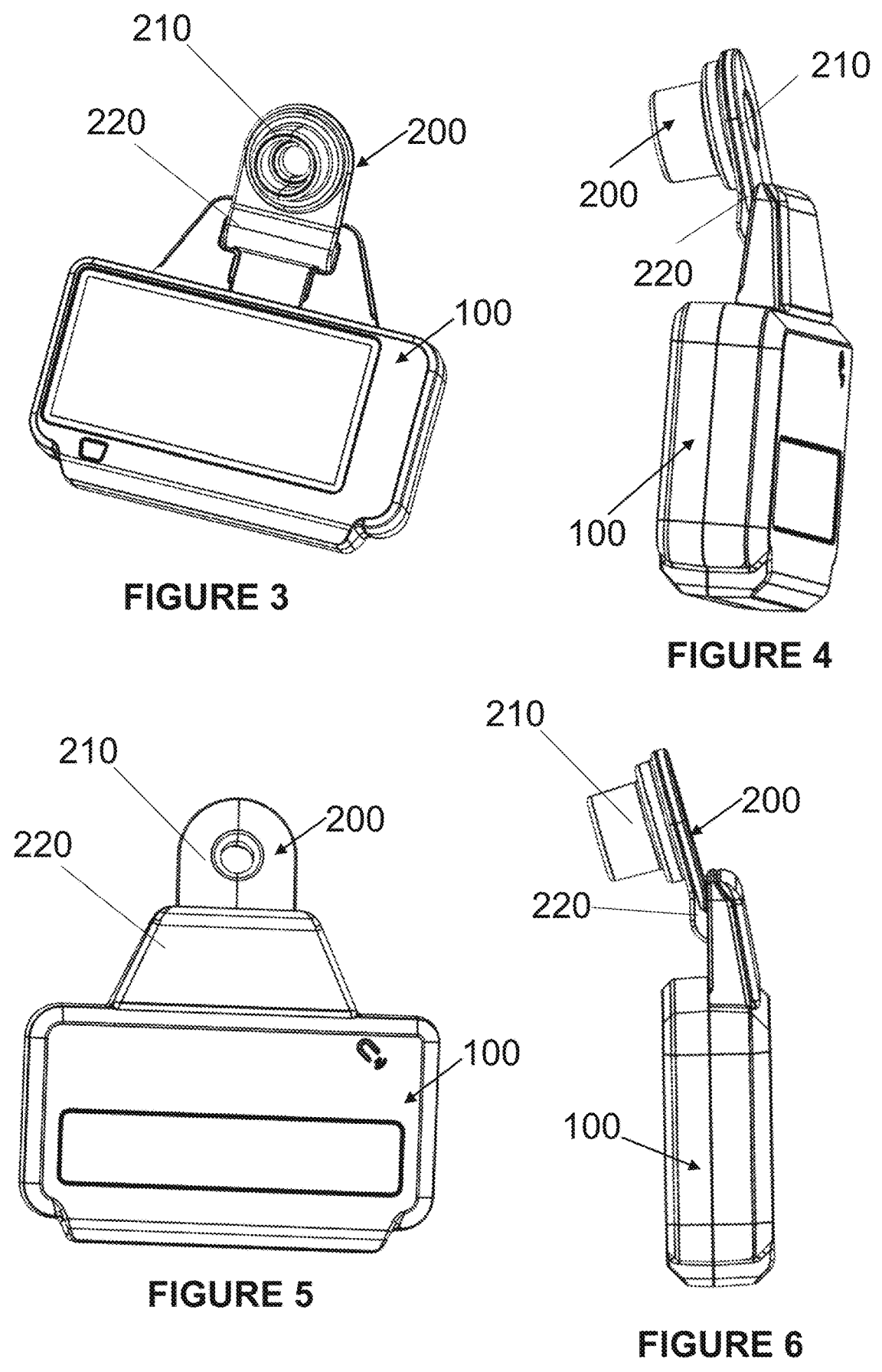
Figures 7, 8, 9, 10:
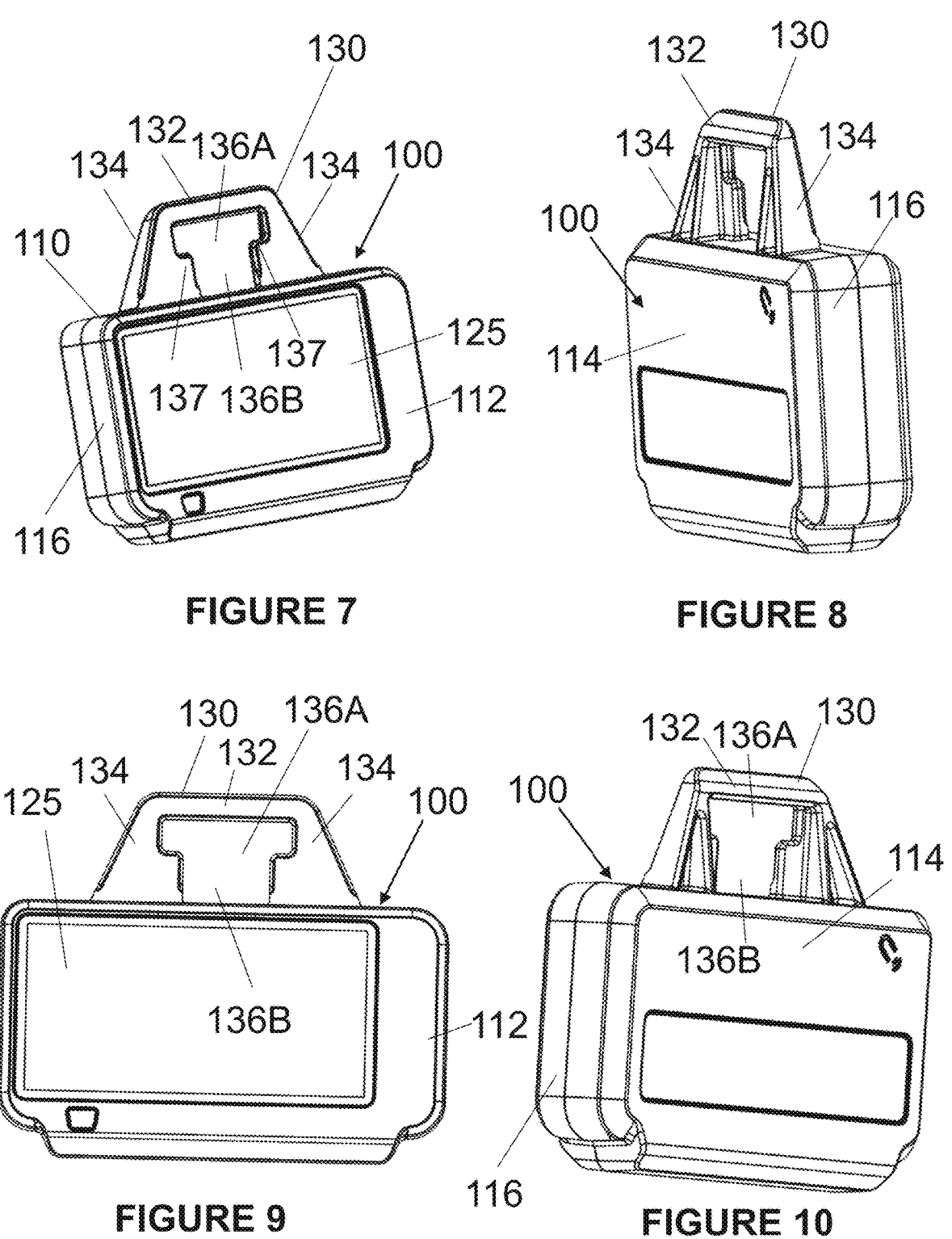
FIGS. 7 to 10 illustrate various isolated views of the animal tag 100.
Figure 11:
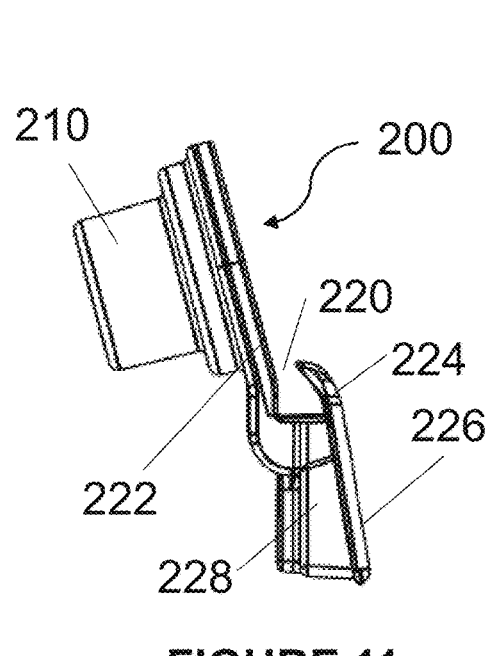
FIGS. 11 to 14 illustrate various isolated views of the tether body 200.
Figure 12:
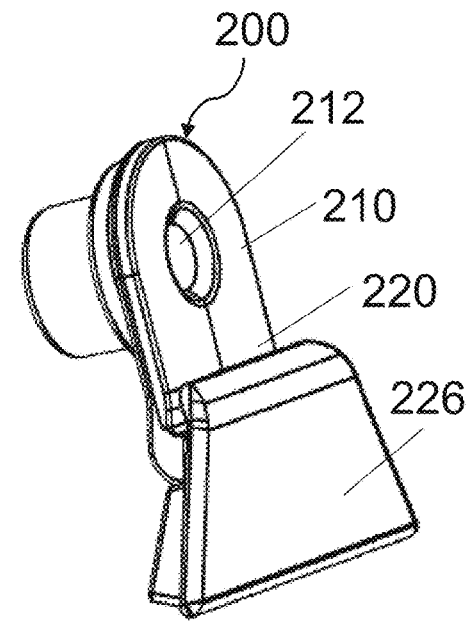
Figure 13:
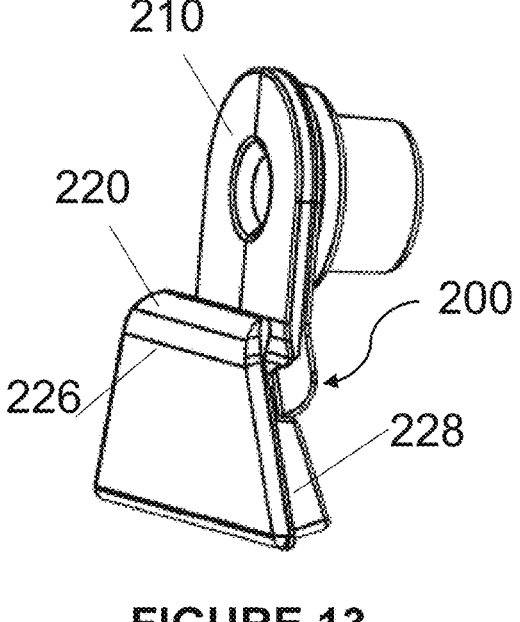
Figure 14:
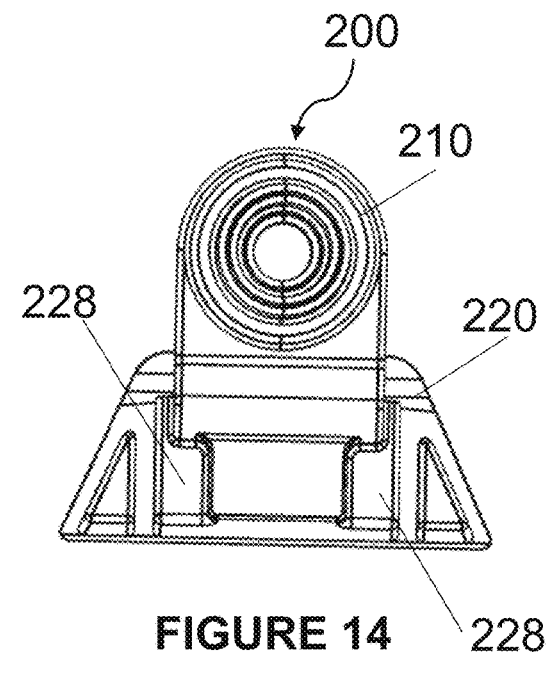
Figure 15:
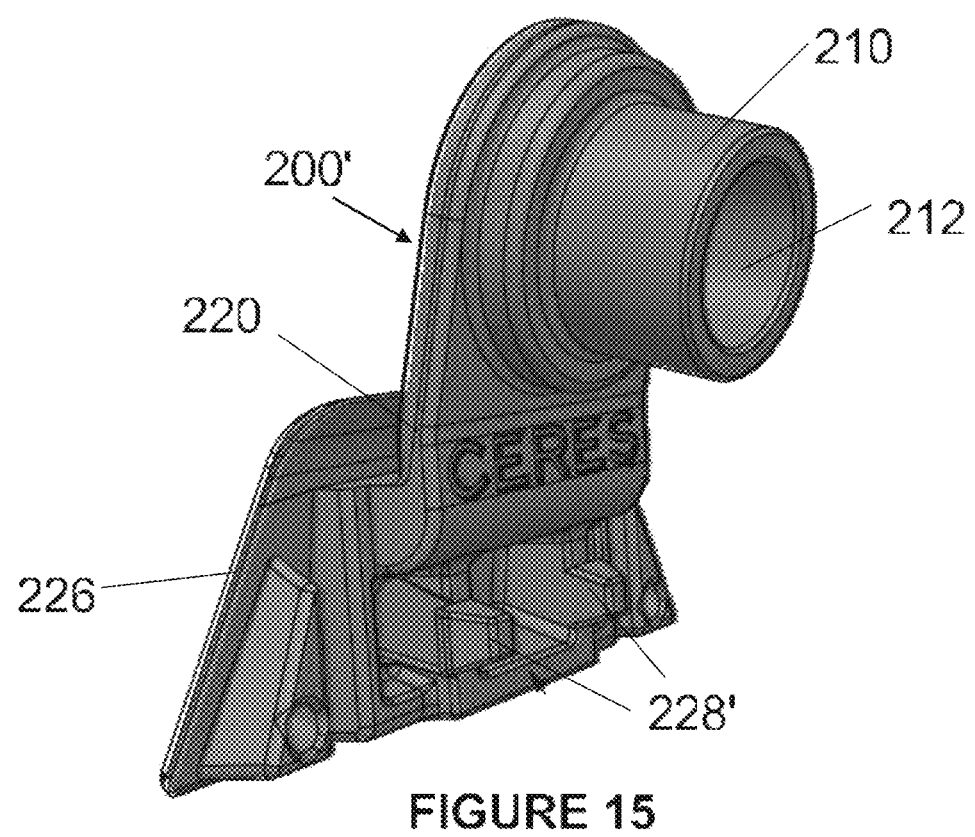
Figure 16:
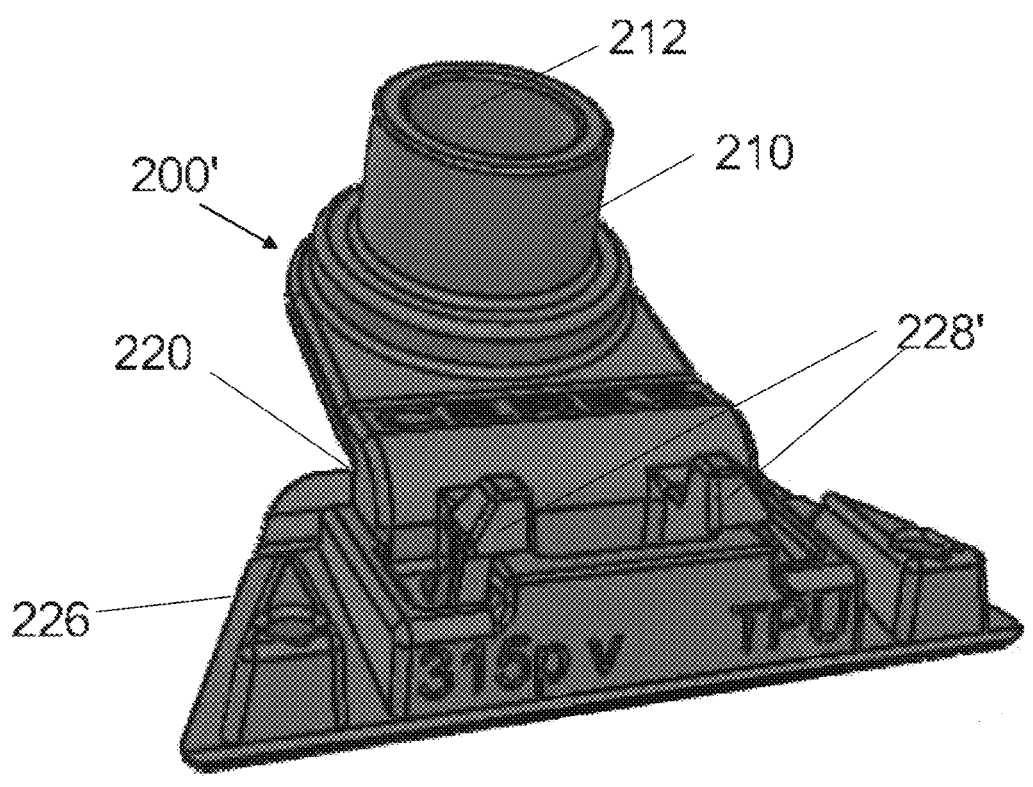
Figure 17:
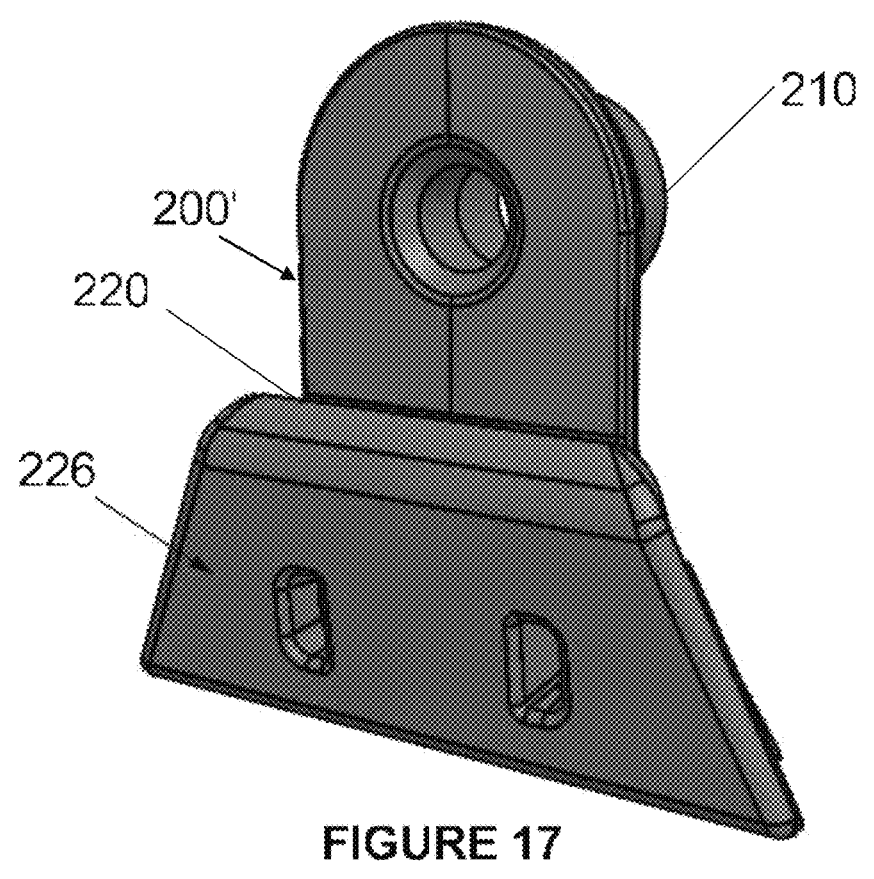
Figure 18:
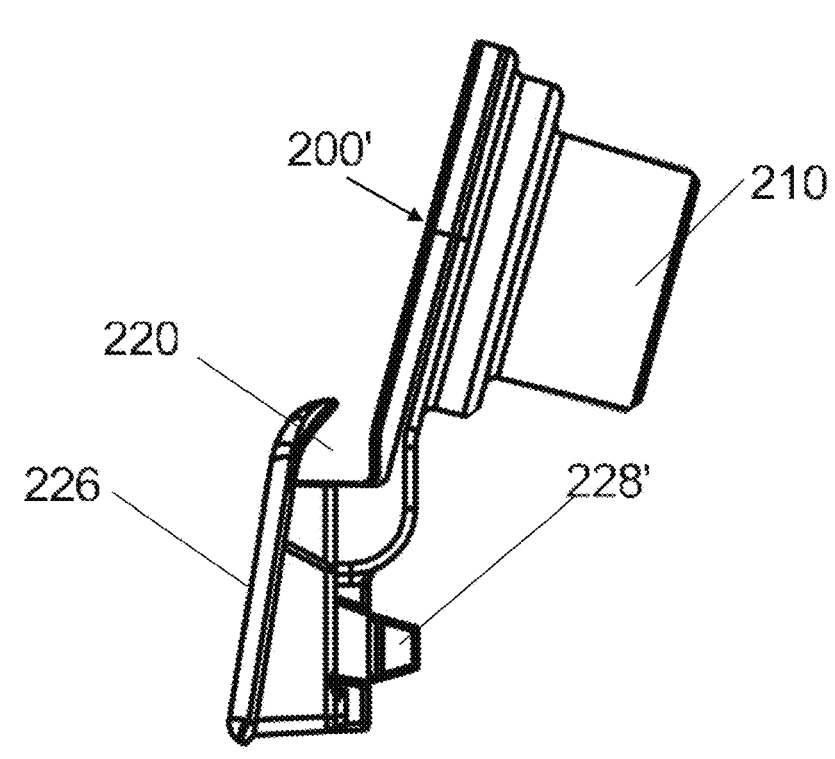
Figure 21:
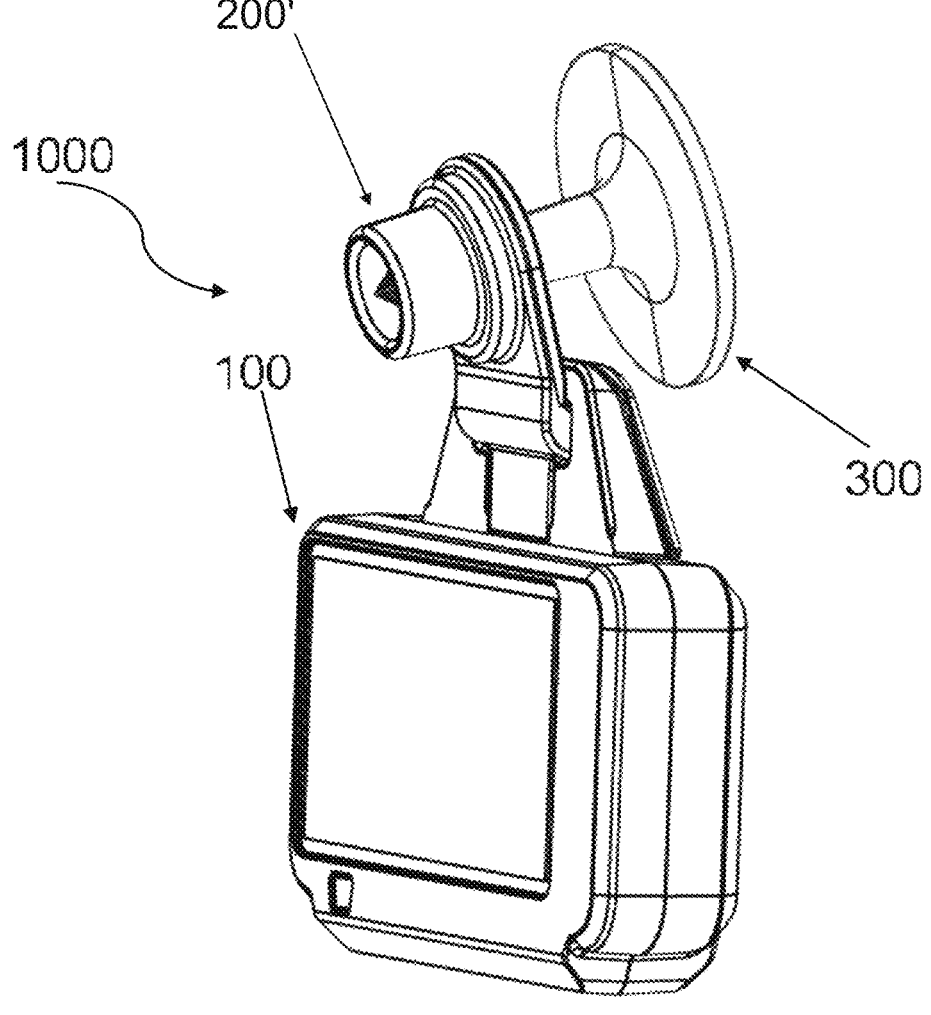
FIG. 21 is a perspective view (environmental view) of the animal tag assembly 1000 utilizing the tether body 200'.

Referring to FIGS. 4 and 8, each leg 134 comprises a thickness extending in a transverse direction relative to the length of the ear tag 100 and the thickness of the legs 134 increases in an in-use downwardly direction towards the side wall 116 to form a respective wedge-shaped leg body. Importantly, the wedge-shaped body formed by each leg 134 is dimensioned to tilt the outer face 112 such that the plane of the outer face is at an acute angle relative to the plane of the upper female coupling portion 210 of the tether body 200.

We refer to FIGS. 11 to 14 which show detailed and isolated views of the tether body 200. The cradle 220 in the tether body 200 is formed by two spaced apart channel walls 222 and 224 which are separated by a channel portion that is dimensioned to receive and secure the cradle engagement member 132 of the tag 100. The first channel wall 222 is formed continuously with the upper female coupling portion 210 and the second spaced apart channel wall 224 comprises a wall height that is greater than height of the cradle engagement member 132 to avoid contact between the cradle engagement portion and skin of the animal during use. A top portion of the second channel wall 224 is turned inwardly towards the first wall 222 for securement and prevent the cradle engagement member 132 from popping out of the cradle 220 of the tether body 200. The second wall 224 also includes a downwardly dependent portion 226 that forms a shield between the attachment portion 130 of the tag 100 and the animal's skin during use. As a result, only the replaceable tether body 200 and stud components 300 touch the animal to optimise the biosecurity effectiveness. As was discussed previously, the opening 136 in the attachment member 130 of the tag 100 includes a broader opening portion 136A and a narrower opening portion 136B. The channel portion connecting the channel side walls 222 and 224 is positioned in the upper and relatively broader opening portion 136A. The downwardly dependent portion 226 includes projecting engagement portions 228 which engage (via snap fitting) with portions of the attachment member legs 134 that define the lower opening portion 136B of the attachment member 130 of the tag 100. The additional engagement provided by the engagement portions 138 prevents the tag 100 from moving or swinging relative to the tether and helps in generally maintaining the orientation of the outer face 112 (with the PV panel) for optimal solar collection.

FIGS. 15 to 21 shows detailed and isolated views of another embodiment of the tether body 200'. Like reference numerals denote like features that have been previous discussed in the earlier sections. The main difference between the tether body 200' and the previously described tether body 200 relates to the provision of projecting engagement portions 228' which comprises a different engagement structure when compared to the engagement portions 228 for the previously described tether body 200. The engagement portions 228' comprise convergent guiding surfaces 229' on the respective ends for the engagement portions 228' to guide the engagement portions 228' into the lower opening portion 136B between the spaced apart legs 134 of the electronic tag 100. The engagement portions 228' are made from resilient materials which are biased to remain in the spaced apart configuration as shown in FIGS. 15 to 21. The engagement portions 228' include stopping sections that lap and snap over the edges defining the lower opening portions 228'. As a result, the engagement portions 228' are prevented from becoming dislodged relative to the lower opening portion 136B unless the engagement portions 228' are moved towards each other by overcoming the biasing force applied on the engagement portions 228'. This mechanism therefore functions as a retention mechanism and allows easy uncoupling of the tether body 200 from the electronic tag 100.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An animal ear tag assembly comprising:
a housing for enclosing electronic components, the housing comprising at least photovoltaic panel being arranged to form an external frontal outer face of the tag for receiving sunlight and powering the electronic componentry therein; and
a tether body configured to contact the animal's body during use, the tether body having an in-use upper female coupling portion for receiving and coupling an ear attachment stud member and an in-use lower cradle portion being configured for securing an attachment portion of the ear tag extending from the housing of the tag to arrange the photovoltaic panel in an outwardly facing configuration during use,
wherein the attachment portion comprises a cradle engaging member extending along the length of one of said side walls of the ear tag housing, the cradle engaging member being attached to the side walls by spaced apart legs such that the cradle engaging member, the spaced apart legs and a portion of one of the side walls define a hollow opening.

2. The animal ear tag assembly in accordance with claim 1 wherein the ear tag housing comprises a rear inner face that is spaced away from the frontal outer face with side walls extending between frontal face and rear face to form the housing to house the electronics and wherein the attachment portion of the ear tag projects outwardly from one of the side walls of the ear tag.

3. The animal ear tag assembly in accordance with claim 1 wherein the hollow opening comprises an upper opening portion located above a lower opening portion wherein the lower opening portion is narrower than the upper opening portion.

4. The animal ear tag assembly in accordance with claim 3 wherein the in-use lower cradle portion is formed by two spaced apart walls separated by a channel portion to receive and secure the cradle engagement member of the tag body.

5. The animal ear tag assembly in accordance with claim 4 wherein the first of said spaced apart walls is formed continuously with the upper female coupling portion and the second of said spaced apart wall comprises a wall height that is greater than height of the cradle engagement member to avoid contact between the cradle engagement portion and skin of the animal during use.

6. The animal ear tag assembly in accordance with claim 5 wherein the second of said walls further comprises a downwardly dependent portion to form a shield between the attachment portion of the tag and the animal's skin during use.

7. The animal ear tag assembly in accordance with claim 1 wherein each leg comprises a thickness extending a transverse direction relative to the length of the ear tag wherein the thickness of the legs increases in an in-use downwardly direction towards the side wall to form a respective wedge-shaped body.

8. The animal ear tag assembly in accordance with claim 7 wherein the wedge-shaped body formed by each leg is dimensioned to tilt the outer face such that the plane of the outer face is at an acute angle relative to the plane of the upper female coupling portion of the tether body.

9. The animal ear tag assembly in accordance with claim 8 wherein the channel portion of the cradle is positioned in the upper opening portion of the hollow opening.

10. The animal ear tag assembly in accordance with claim 8 wherein tether body further comprises an additional tether engagement portion that snaps into the lower opening portion of the tag.

11. The animal ear tag assembly in accordance with claim 1 wherein coupling portion of the tether body comprises a thorough hole extending therethrough for receiving and securing the stud member.

12. The animal ear tag assembly in accordance with claim 1 wherein the coupling portion of the tether body is adapted to receive and secure the stud member whereby the stud member comprises an enlarged head with an elongate shank such that the shank portion of the stud member is received into a first lateral side along a first direction and allows the shank to be inserted and passed through the tether body in a transverse c uncoupling of the stud member from the tether body.

\* \* \* \* \*